US010180564B2

(12) United States Patent
Asundi et al.

(10) Patent No.: US 10,180,564 B2
(45) Date of Patent: Jan. 15, 2019

(54) METHODS AND SYSTEMS FOR TRANSPORT-OF-INTENSITY IMAGING

(71) Applicant: NANYANG TECHNOLOGICAL UNIVERSITY, Singapore (SG)

(72) Inventors: Anand Krishna Asundi, Singapore (SG); Chao Zuo, Singapore (SG)

(73) Assignee: NANYANG TECHNOLOGICAL UNIVERSITY, Singapore (SG)

(*) Notice: Subject to any disclaimer, the term of this patent is extended or adjusted under 35 U.S.C. 154(b) by 243 days.

(21) Appl. No.: 14/902,549

(22) PCT Filed: Jul. 2, 2014

(86) PCT No.: PCT/SG2014/000320
§ 371 (c)(1),
(2) Date: Dec. 31, 2015

(87) PCT Pub. No.: WO2015/002614
PCT Pub. Date: Jan. 8, 2015

(65) Prior Publication Data
US 2016/0139388 A1 May 19, 2016

Related U.S. Application Data

(60) Provisional application No. 61/842,172, filed on Jul. 2, 2013.

(51) Int. Cl.
G02B 21/00 (2006.01)
G02B 26/06 (2006.01)
(Continued)

(52) U.S. Cl.
CPC ......... G02B 21/008 (2013.01); G02B 21/006 (2013.01); G02B 21/0032 (2013.01);
(Continued)

(58) Field of Classification Search
None
See application file for complete search history.

(56) References Cited

U.S. PATENT DOCUMENTS 8,212,915 B1* 7/2012 Clark ............... G11B 27/034
348/335
2003/0155537 A1* 8/2003 Machavariani ........ G01N 21/21
250/559.27
(Continued)

OTHER PUBLICATIONS

Zuo et al. ("Transport-of-intensity phase imaging using Savitzky-Golay differentiation filter—theory and applications").*
(Continued)

Primary Examiner — Mohammed Jebari

(57) ABSTRACT

A transport-of-intensity imaging system is proposed which incorporates a control element positioned in an optical relay system, such as a 4f optical relay system, between a microscope system for generating an image of a specimen, and an image capturing device. The control element is located with an optical relay system, and is controllable to vary the focal plane without changing the spacing of the specimen and the image capturing device. In one form the control element is an electronically tunable lens (ETL). In another form, the control element is a spatial light modulator (SLM). The arrangement may include a beam splitter arrangement for generating a plurality of beams, which are not all subject to the same control element, such that multiple images with different focal planes are captured from the respective beams.

12 Claims, 6 Drawing Sheets

(51) Int. Cl.
G02B 27/10 (2006.01)
G02B 21/36 (2006.01)

(52) U.S. Cl.
CPC .......... *G02B 21/365* (2013.01); *G02B 26/06* (2013.01); *G02B 27/10* (2013.01)

(56) References Cited

U.S. PATENT DOCUMENTS

| | | | | |
|---|---|---|---|---|
| 2006/0177102 | A1* | 8/2006 | McGraw | G01W 1/02 382/107 |
| 2007/0268545 | A1* | 11/2007 | Gluckstad | G02B 21/14 359/237 |
| 2010/0214639 | A1* | 8/2010 | Watson | G02B 21/002 359/213.1 |
| 2011/0134521 | A1* | 6/2011 | Truong | G01N 21/6408 359/388 |
| 2013/0147925 | A1* | 6/2013 | Lew | H04N 13/0203 348/49 |
| 2013/0278744 | A1* | 10/2013 | Debarre | G02B 21/06 348/79 |
| 2015/0145980 | A1* | 5/2015 | Bryll | G02B 21/367 348/79 |
| 2015/0192510 | A1* | 7/2015 | Piestun | G01B 11/002 702/151 |
| 2017/0153434 | A1* | 6/2017 | Shaked | G02B 21/0056 |

OTHER PUBLICATIONS

Ishizuka et al., "Phase measurement of atomic resolution image using transport of intensity equation," published by Oxford University Press on behalf of Japanese Society of Microscopy, Journal of Electron Microscopy 54(3): 191-197 (2005). (Year: 2005).*
F. Zernike, "How I Discovered Phase Contrast," Science 121, 345-349 (1955).
E. Cuche, P. Marquet, and C. Depeursinge, "Simultaneous amplitude-contrast and quantitative phase-contrast microscopy by numerical reconstruction of Fresnel off-axis holograms," Appl. Opt. 38, 6994-7001 (1999).
Q. Weijuan, C. O. Choo, Y. Yingjie, and A. Asundi, "Microlens characterization by digital holographic microscopy with physical spherical phase compensation," Appl. Opt. 49, 6448-6454 (2010).
B. Rappaz, P. Marquet, E. Cuche, Y. Emery, C. Depeursinge, and P. Magistretti, "Measurement of the integral refractive index and dynamic cell morphometry of living cells with digital holographic microscopy," Opt. Express 13, 9361-9373 (2005).
B. Kemper and G. von Bally, "Digital holographic microscopy for live cell applications and technical inspection," Appl. Opt. 47, A52-A61 (2008).
M. Reed Teague, "Deterministic phase retrieval: a Green's function solution," J. Opt. Soc. Am. 73, 1434-1441 (1983).
A. Barty, K. A. Nugent, D. Paganin, and A. Roberts, "Quantitative optical phase microscopy," Opt. Lett. 23, 817-819 (1998).
D. Paganin and K. A. Nugent, "Noninterferometric Phase Imaging with Partially Coherent Light," Physical Review Letters 80, 2586-2589 (1998).
L. Waller, Y. Luo, S. Y. Yang, and G. Barbastathis, "Transport of intensity phase imaging in a volume holographic microscope," Opt. Lett. 35, 2961-2963 (2010).
L. Waller, S. S. Kou, C. J. R. Sheppard, and G. Barbastathis, "Phase from chromatic aberrations," Opt. Express 18, 22817-22825 (2010).
S. S. Gorthi and E. Schonbrun, "Phase imaging flow cytometry using a focus-stack collecting microscope," Opt. Lett. 37, 707-709 (2012).
E. D. Barone-Nugent, A. Barty, and K. A. Nugent, "Quantitative phase-amplitude microscopy I: optical microscopy," Journal of Microscopy 206, 194-203 (2002).
S. Ulf and P. O. J. Werner, "Digital recording and numerical reconstruction of holograms," Measurement Science and Technology 13, R85 (2002).
C. Falldorf, M. Agour, C. v. Kopylow, and R. B. Bergmann, "Phase retrieval by means of a spatial light modulator in the Fourier domain of an imaging system," Appl. Opt. 49, 1826-1830 (2010).

* cited by examiner

METHODS AND SYSTEMS FOR TRANSPORT-OF-INTENSITY IMAGING

FIELD OF THE INVENTION

The present invention relates to methods and systems for transport-of-intensity imaging. In particular, it relates to methods and systems which are suitable for imaging subjects which are evolving over time, and which have to be repeatedly imaged at short time intervals, for example with time intervals of less than a second, or more preferably less than a tenth of a second. This is referred to here as imaging for a dynamics application.

BACKGROUND OF THE INVENTION

Over the past decade, a great deal of scientific attention has been paid to quantitative phase imaging, which has emerged as an important tool for phase visualization and structure retrieval of miniature non-absorbing specimens such as micro-optical elements, unstained cells, and other types of biological and transparent technical samples. Zernike phase contrast [1] and differential interference contrast microscopy [2] have proven to be extremely powerful imaging tools for visualization of phase variation. However, in general the phase information obtained through such means is neither linear nor quantitative, yielding only qualitative descriptions in terms of optical path-length measurement.

Interference techniques such as digital holography microscopy (DHM) are well established methods for quantitative phase measurement [4]. DHM has been successfully demonstrated in the characterization of a microlens array [4], investigations of cellular dynamics [5] and drug-induced morphology changes [6]. However, this class of method typically relies on two-beam interference with a high degree of coherence and thus is usually plagued with problems of phase aberration and coherent noise that prevent accurate phase retrieval and formation of high quality images.

About thirty years ago, Teague [7] derived an equation for wave propagation in terms of phase and intensity distributions, and showed that the phase distribution may be determined by measuring only the intensity distributions. We call this equation the Transport-of-Intensity Equation (TIE).

Let us consider an electro-magnetic wave propagating in a direction z called the optic axis towards an object plane. The two perpendicular directions (transverse spatial coordinates) are denoted by x,y, and the position vector r denotes the position (x,y) in the object plane, i.e. the position as measured with the two transverse spatial coordinates. The wave has an intensity in the object plane denoted by I(r) and a phase in the object plane denoted by φ(r). Originating from the free-space Helmholtz wave equation, the TIE relates the object-plane phase to the first derivative of intensity with respect to the optical axis in the near Fresnel region [7] as follows, $$-k\frac{\partial I(r)}{\partial z} = \nabla_\perp \cdot [I(r)\nabla_\perp \varphi(r)], \quad (1)$$

where k is the wave number $2\pi/\lambda$, and $\nabla_\perp$ is the gradient operator over r.

Suppose that I(r)>0, (note that I(r) can take on the value of zero but to use the TIE, I(r) has to be greater than zero) and with appropriate boundary conditions, the solution to TIE is known to exist and be unique [7]. That is, the phase φ(r) can be uniquely determined by solving TIE using an observed intensity I(r) and longitude intensity derivative $\partial I(r)/\partial z$. Experimentally, the intensity is easy to obtain. The intensity derivative can be estimated by a finite difference between the two or more closely separated images (i.e. at different values of z). In prior art systems, this was done by acquiring an image stack with slight defocus, by translating the camera or the object manually or mechanically.

The TIE-based phase imaging technique has been increasingly investigated in recent years because of its unique advantages over interferometric techniques [8,9]: it is non-interferometric, works with partially coherent light sources, is computationally simple, does not need phase unwrapping, and does not require a complicated optical system. However, despite its evident merits and great improvements, TIE-phase imaging technology has still not gained as much attention or such widespread applications as interferometric techniques in quantitative phase microscopy. One important reason is that, as noted, the TIE typically requires a series of images captured at different focal depths that are usually realized by translating the camera or the object manually or mechanically. This not only complicates the image acquisition process, but also prolongs the measurement time, precluding real-time observation of a dynamic process.

Techniques have previously been proposed to avoid the need for mechanical motion in the stack acquisition. In [10], the image is captured by a volume holograph which produces a three-dimensional intensity image. In [11], the chromatic aberration inherent in any lens system is exploited, by comparing the intensity images associated with different respective light frequency ranges. In [12], the sample is caused to flow through the focal plane, so that images acquired at different times correspond to different object planes. However, it is still demanding to produce a simple, practical, non-mechanically controlled focus-variable system that can deliver performance near diffraction-limited imaging, for enabling high-speed TIE phase imaging for dynamics applications.

SUMMARY OF THE INVENTION

The present invention aims to provide new and useful methods and apparatus for performing TIE imaging, and in particular methods and apparatus which overcome one or more of the problems of conventional systems mentioned above.

In general terms the invention proposes that an imaging system incorporates an optical relay system positioned between a microscope system for generating a magnified image of a specimen, and at least one image capturing device (a camera, such as a charge coupled device (CCD)). The optical relay system contains a control element which is controllable to vary a plane of the specimen which is in focus in the image captured by the image capturing device without changing the spacing of the specimen and the image capturing device.

The optical relay system may be a 4f optical relay system, including two lenses of focal distance f spaced apart by a distance (as perceived by a light beam passing through the optical relay system) of 2f. The focal lengths of the lenses may be different. Also, the optical relay system may alternatively be realized using other configurations. Generally, the optical relay system is telecentric (the control element is placed at the Fourier plane of the telecentric position).

Preferably, the magnification of the image captured by the image capturing device is independent of the variation caused by the control element.

Since the control element does not vary the spacing of the specimen and the image capturing device, it is not subject to the disadvantages associated with this described above. This means that embodiments of the invention may be employed for dynamic imaging applications, as well as for static imaging applications.

The invention may be implemented on almost all types of known microscopes.

As demonstrated below, the present invention permits numerical processing of acquired images for real time (or near real time) phase visualization and characterization.

In a first form of the invention the control element comprises at least one electronically tunable lens, located in particular in the Fourier plane of the image-relay system.

In a second version of the invention, the control element comprises at least one electronically controllable element for modifying the phase of the beam. The controllable element operates as a spatial light modulator.

In a preferred form of the invention, a beam splitter is provided in the optical path (and preferably within the optical relay device), to form a plurality of beams, which are not all subject to the same control element, the system being arranged to capture (typically substantially simultaneously) respective images using each of the beams, such that multiple images with different focal planes are generated from the respective beams. This enables TIE phase recovery to be performed at frame rates that are limited only by the speed of the camera.

Preferably, the beams are ultimately directed towards the same image capturing device, such that the images are captured at locations on an image capturing surface of the image capturing path which are spaced apart parallel to that surface. Conveniently, this can be because at least one of the beams is subject to an reflection from a surface which is at a non-zero angle (preferably in the range 1 degree to up to 10 degrees) to the direction at which the beam impinges on the surface.

These schemes proposed by the embodiment offer the possibility to extend TIE phase imaging to the study of fast moving objects and structural changes in dynamic processes. By using the numerical reconstruction implemented by the computer software, real-time transport of intensity imaging to be realized.

The term "light" is used in this document to refer electromagnetic radiation of any wavelength, although in the embodiments it is preferably visible light.

BRIEF DESCRIPTION OF THE FIGURES

Embodiments of the invention will now be described, for the sake of example only, with reference to the following drawings in which:

FIG. 6(d) shows the wrapped phase. FIG. 6(e) shows the 3D profile for one single lens, and FIG. 6(f) is the height distribution obtained using a confocal system and FIG. 6(g) shows the comparison of the line profiles using the confocal, DH and TIE systems respectively.

DETAILED DESCRIPTION OF THE EMBODIMENTS

Two embodiments of the invention are now described, together with experimental results which show that the embodiments allow fast data acquisition, which can be used for solving the Transport-of-Intensity equation to extract the quantitative phase, and thus permit fast imaging.

1. First Embodiment

The first embodiment is a TIE system which employs a tunable lens (TL) for achieving high speed transport of intensity imaging. The setup is shown schematically in FIG. 1. The embodiment is obtained by adding a novel image relay system to the camera port of a conventional microscope. In the example below this is a commercial inverted microscope used in the transmission mode, but note that the principle would work for other microscopes, and can be used independently of whether the microscope is operated in the transmission or reflection mode.

Figure 1:
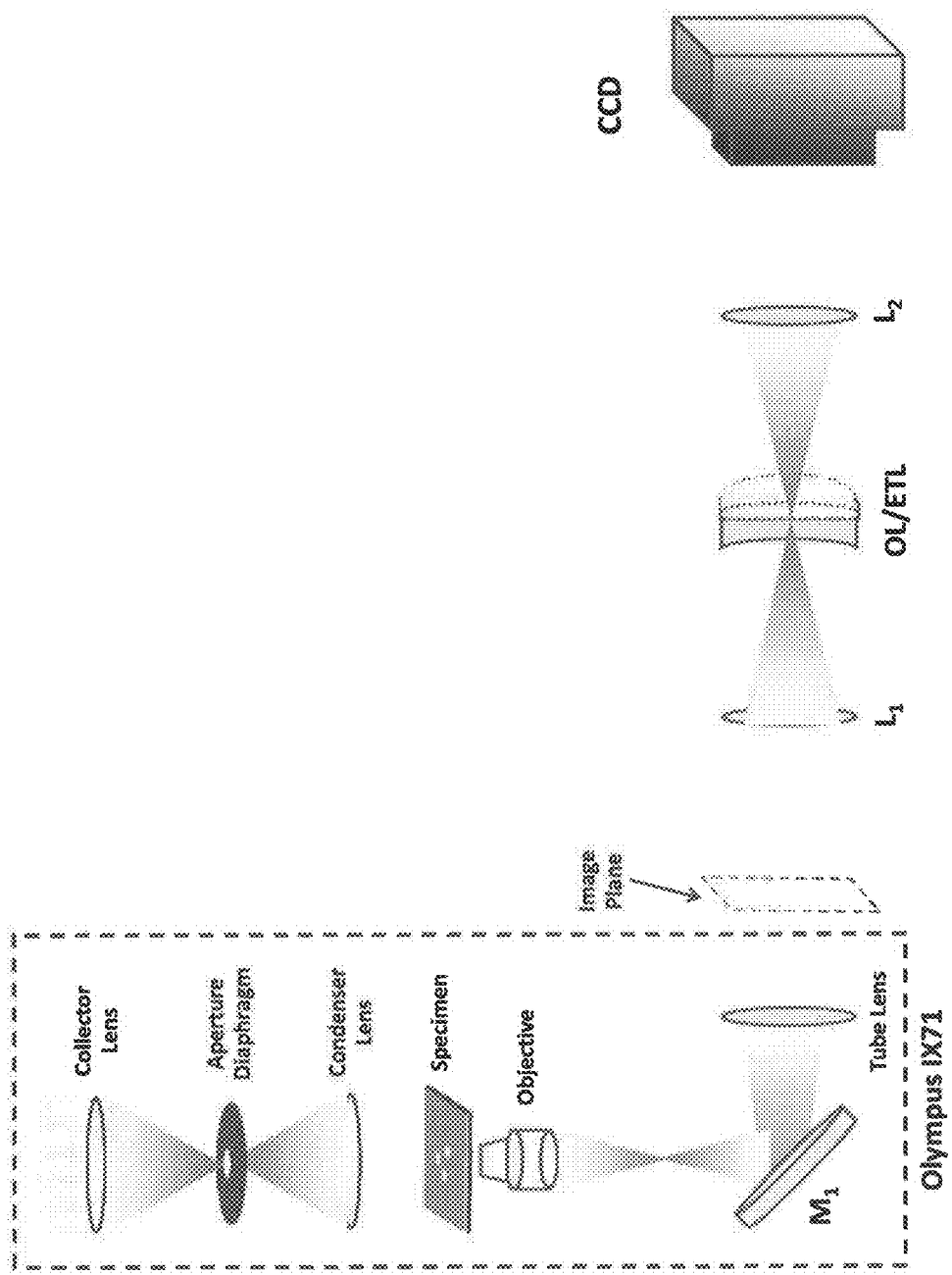
FIG. 1 shows schematically the set-up of a first embodiment of the invention which is a tunable lens (TL) TIE system.

At the left FIG. 1 is the conventional inverted bright field microscope system, designated Olympus IX71, which comprises a collector lens, a condenser aperture diaphragm, a condenser lens, an objective, a reflective mirror (M1), and a tube lens. An specimen to be imaged is located on a support between the condenser lens and objective. The microscope produces a magnified image of the specimen at the camera output port (image plane). All the objectives used are infinity-corrected and match the focal length of the tube lens (which in our experiments was 180 mm). Preferably the microscope objective is infinity corrected, and combined with a compatible tube lens. In a variation of the embodiment the microscope may be set-up to act in the reflective mode, which can be used to measure reflective samples.

A partially coherent white light source with a green interference filter (in our experiment this had a central wavelength $\lambda$=550 nm) is used for illumination. In our experimental results, the illumination used the built-in light source of the microscope, preferably combined with an interference filter, and the condenser aperture diaphragm was stopped down to about 20% of the objective numerical aperture to increase the spatial coherence of the illumination.

The relay system comprised a standard 4f system comprising two lenses $L_1$ and $L_2$. This was supplemented by an electronically tunable lens (ETL) optionally combined with a concave offset lens (OL) located at the Fourier plane. In our experiments these had respective focal lengths $f_1$ and $f_2$, which both had the same value $f=f_1=f_2=150$ mm; in variations of the embodiment these values may be different.

The ETL is a commercially available plano-convex lens. In our experiment an ETL was used which had a tunable focal length range of +50 to +200 mm and a 10 mm clear aperture. In order to realize focusing along positive and negative directions with respect to the intermediate image plane, the ETL was paired with an OL of −100 mm focal length. In a variation of the embodiment, an ETL may be used which can vary its focal length both negatively and positively, and in this case the OL is omitted.

The lens $L_1$ is placed at a distance f from the image plane and a distance f from the ETL, so that $L_1$ acts as a Fourier lens. Similarly, the lens $L_2$ is at a distance f from the CCD and a distance f from the ETL, such that $L_2$ acts as a Fourier lens.

The Fourier lens $L_1$ relays the back focal plane of the objective onto the OL/ETL. Fourier lens $L_2$ reconstructs the final image at the CCD plane, which is conjugated with the image plane. Adjusting the focal length of the ETL shifts the object plane without changing its magnification. Since the specimen to be imaged usually has a length much greater than its thickness, for the TIE phase measurement, it is assumed that the object is sufficiently thin such that it can be considered as being on a single plane. However, in practice, the ETL may produce an out-of-focus image in the CCD in situations where the above assumption is not true.

One important assumption inherent in TIE phase imaging is that the system should be telecentric [13]. This assumption guarantees that the re-focusing does not introduce phase curvature over the field of view so that the through focus stack can deliver a series of images with equal magnification. The telecentricity in the proposed scheme shown in FIG. 1 can be analyzed using physical optics. Analyzing the situation from the perspective of scalar diffraction, free-space propagation is described by a linear shift invariant system. The propagation of light from the focus plane to a parallel plane at nonzero distance $\Delta z$ is described by a convolution of the incident complex field $u_0(x,y)$ with the impulse response of free-space propagation kernel $h_{\Delta z}(x,y)$ over the distance $\Delta z$ [14]:

$$u_{\Delta z}(x,y)=u_0(x,y) \otimes h_{\Delta z}(x,y), \quad (2)$$

From the angular spectrum perspective, the following expression equivalent to Eq. (2) in spatial frequencies can be obtained $$\hat{u}_{\Delta z}(u,v)=\hat{u}_0(u,v) H_{\Delta z}(u,v), \quad (3)$$

Fourier transforms are denoted by the corresponding hatted capital letters. (u,v) is the vector in frequency space corresponding to (x,y).

The function H is called the "transfer function" and characterizes the free-space propagation phenomenon in the frequency domain [14]:

$$H_{\Delta z}(u, v) = \exp\left[j\frac{2\pi\Delta z}{\lambda}\sqrt{1-(\lambda u)^2-(\lambda v)^2}\right], \quad (4)$$

If the characteristic object frequencies are less than $\lambda^{-1}$, we can neglect the evanescent waves (i.e. the case where the square root is imaginary). Further, with a proximity approximation, the transfer function can then be simplified as:

$$H_{\Delta z}(u,v)=\exp[-j\pi\lambda\Delta z(u^2+v^2)], \quad (5)$$

Finally, performing an inverse Fourier transform of Eq. (3) to convert back into the spatial domain, the complex field can be represented by:

$$u_{\Delta z}(x,y)=\mathscr{F}^{-1}\{\mathscr{F}\{u_0(x,y)\} H_{\Delta z}(u,v)\}, \quad (6)$$

The discrete version of Eq. (6) is well known as convolution method [16], which is widely used in digital holography reconstruction. The major advantage of convolution method is its ability to maintain the size of the image field, independent of the propagation distance $\Delta z$.

Considering the Fourier transform property of the 4f system, the free-space propagation process described above can be physically emulated by modulating the light incident in the Fourier plane with the propagation transfer function. With the paraxial approximation [14,16], the phase transformation produced by the combination of the tunable lens and the offset lens can be represented by:

$$t_l(\xi, \eta) = \exp\left[-\frac{j\pi}{\lambda f_c}(\xi^2+\eta^2)\right], \quad (7)$$

where $$f_c = \frac{f_{ETL} f_{OL}}{f_{ETL}+f_{OL}-d}. \quad (8)$$

Here d is the axial distance between the two lenses, and $(\xi,\eta)$ are the spatial coordinates in the Fourier plane of the 4f-setup. Note here we consider the composite lens as 'thin' for simplicity, which is reasonable because d is very small and $f_c$ is much larger than thickness of the two lenses. Comparing Eq. (6) with Eq. (4), we can see the $t_l(\xi,\eta)$ share the same format as the propagation transfer function. To establish the relationship between the focal length variations versus the propagation distances, we should employ the connection between the frequency coordinates in the Fourier domain (u,v) and the spatial coordinates in the Fourier plane of the 4f-setup $(\xi,\eta)$ [14]:

$$(u, v) = \left(\frac{\xi}{\lambda f}, \frac{\eta}{\lambda f}\right). \quad (8)$$

Where f is the focal length of the two Fourier lenses $L_1$ and $L_2$ (f=150 mm). Inserting this into Eq. (4), and then comparing with Eq. (6), we have $$\Delta z = \frac{f^2}{f_c} = \frac{f^2(f_{ETL}+f_{OL}-d)}{f_{ETL} f_{OL}}. \quad (9)$$

Since $f_{ETL}$ can be electronically controlled, the defocus distance can be easily shifted whilst maintaining the position of the in-focus image plane and image magnification (which is −1 because performing the Fourier transform twice results in a spatially reversed version of the image). In our setup, the ETL was driven by a custom current source, which offered an adjustable full-scale output current from 0 to 300 mA, with a resolution up to 0.1 mA. With reference to Eq. (9), the range of $\Delta z$ can be estimated to be ±30 mm with an offset lens, f=−100 mm, attached to the ETL. This is sufficient for general applications because TIE does not require a large defocus range. With the help of ETL, the CCD camera can rapidly acquire images at different image distances through electrical control without any mechanical motion. The response time of the ETL was 15 ms (and a shorter response speed may be possible using a different ETL from other company), which enables time division multiplex scanning with fast switching rate.

2. Second Embodiment

Figure 2:
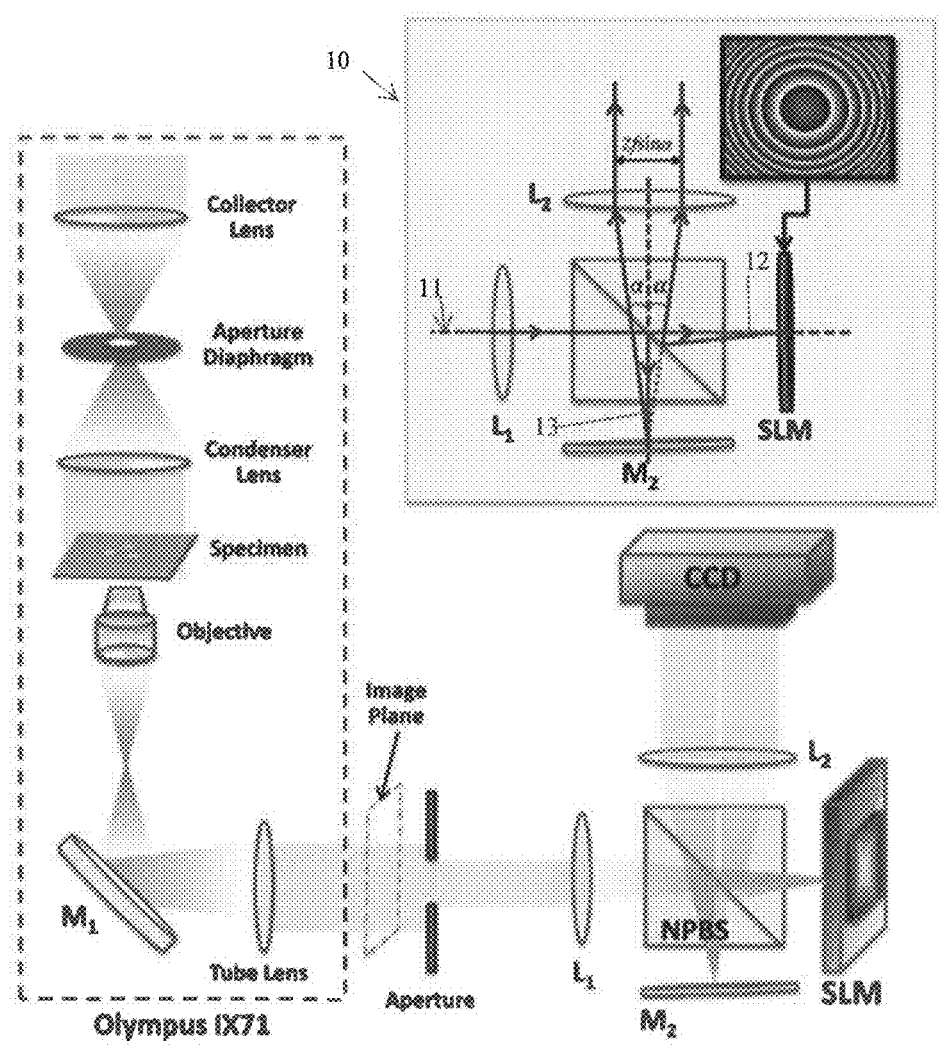
FIG. 2 shows schematically the set-up of a second embodiment of the invention employing a spatial light modulator.

The second schematic setup for achieving single-shot transport of intensity imaging is shown in FIG. 2, including an inset portion 10 which explains the operation of the system. It also employs a commercial inverted microscope (again referred to as an Olympus IX71) with an additional 4f image relay system. All the requirements and specifications of the microscope and the 4f system are same as mentioned above for the first embodiment.

In contrast to the first embodiment, a non-polarizing cube beam splitter (NPBS) splits the image beam 11 into two beams 12, 13. A spatial light modulator (SLM) (located at the Fourier plane) reflects one of these beams (in particular, beam 12) and the second beam 13 is reflected from a plane mirror (M2) located at the Fourier plane. Theoretically, the total distance travelled by the light between the two lenses $L_1$ and $L_2$ is equal to 2f irrespective of which beam 12 or 13 is considered.

However, in practice, depending on the path of the light ray between the two lenses $L_1$ and $L_2$, this total distance may sometimes not be exactly 2f (though, in such cases, the total distance will be almost 2f). The SLM is a reflective liquid crystal phase only panel (Holoeye Pluto, 1920×1080 pixels with a pixel size of 8 μm) and was configured to provide full $2\pi$ phase modulation with a linear electro-optical characteristic. In variants of the embodiment another kind of phase SLM may be used, but the higher the resolution and smaller the pixel size the better the results. The normals of mirror $M_2$ and SLM are at a small angle $\alpha \approx 3°$ with respect to the optical axial direction, thus the two reflected beams are laterally shifted with angular offsets $\pm \alpha$. The reflected beams from the mirror $M_2$ and the SLM need not be laterally shifted with the same angular offset (although, such a symmetric shift is preferable). Rather, in a variant of the second embodiment, an asymmetric shift can be implemented whereby the two reflected beams are laterally shifted with different angular offsets.

Considering the Fourier transform property of the first lens $L_1$, the complex amplitude of the wave field across the Fourier plane $U(\xi,\eta)$ is proportional to the Fourier transform of the complex amplitude incident in the image plane, where vector $(\xi,\eta)=(u/\lambda f, v/\lambda f)$, and $(u,v)$ represents spatial frequencies in two-dimensional image space. The normal of mirror $M_2$ has a small angle with respect to the optical axial direction, thus the reflected beam is laterally shifted with angular offsets $\alpha$ and to the optical axis.

$$G_r(\xi,\eta)=U(\xi,\eta)\exp(-i2\pi\xi \sin \alpha/\lambda) \quad (10)$$

The SLM is loaded with a designed phase pattern, enabling another laterally shifted beam with angular offsets $-\alpha$ to the optical axis. Furthermore, this wave field is also axially-displaced by $\Delta z$ [17]

$$G_t(\xi,\eta)=U(\xi,\eta)\exp(i2\pi\xi \sin \alpha/\lambda)H_{\Delta z}(\xi,\eta) \quad (11)$$

where $H_{\Delta z}(\xi,\eta)$ is the angular spectrum transfer function in the spatial frequency domain which should be displayed on the SLM $$H_{\Delta z}(\xi,\eta)=\exp(-i2\pi\Delta z\sqrt{1-(\lambda\xi)^2-(\lambda\eta)^2}/\lambda) \quad (12)$$

After passing through the lens $L_2$, the $2\alpha$ angular offset is converted to a lateral separation of $2 f \sin \alpha$ between the two half-images.

$$u_r(x,y)=u(x+\sin \alpha f, y) \quad (13)$$

$$u_t(x,y)=u_{\Delta z}(x-\sin \alpha f, y) \quad (14)$$

Thus the two images in the CCD plane are laterally separated by $2 \sin \alpha f$ with a longitude defocus of $\Delta z$. The $\Delta z$ can be easily adjusted by varying the function displayed in SLM, without the need of adjusting the system setup.

3. Variants of the First and Second Embodiments

A variant of the first embodiment may include a beam-splitter (like in the second embodiment) to generate two beams with the ETL located in the path of one of the two beams so that the imaging can be done in a single shot. However, the configuration of the system in this variant of the first embodiment differs from that in the second embodiment since unlike the SLM, the ETL is transmissive rather than reflective.

In a variant of the second embodiment, the mirror $M_2$ is omitted. In this variant, the system would only capture one image at a time and the SLM is controlled to vary the focus over time. This is similar to controlling the ETL/OL pair to vary the focus in the first embodiment, except that the SLM is reflective whereas the tunable lens (ETL) is transmissive. Note that the first embodiment is preferable over this variant of the second embodiment because the response time of the tunable lens (ETL) is shorter than that of the SLM and it is cheaper to use the tunable lens (ETL) instead of the SLM.

In another variant of the second embodiment, the system includes the SLM but this SLM is not controllable i.e. it produces a static phase shift. In this case, the CCD would still collect two images—one in focus and one not in focus. However, this variant is not preferable since it is better if the axial scanning device (SLM) is controllable so that the defocus distance can be controlled.

4. Numerical Processing of the Acquired Images

By using the above-described setups, images with different defocus distance can be acquired by the CCD camera and then stored in the computer memory. For dynamic measurement, usually two or three images are acquired from one measurement. For the tunable lens based system, these images are individual ones and while for the SLM based system, the two images are recorded in a single shot. Accurate registration of the multiple experimental images should be performed (this can be done manually or using some image registration algorithms).

For the second embodiment, once the lateral translation between the two half images is obtained, no other calibration procedure is needed for the successive measurement unless the setup is changed. The intensity derivative then is estimated by $$\frac{\partial I(x, y)}{\partial z} \approx \frac{I_{\Delta z}(x, y) - I(x, y)}{\Delta z}.$$

Similarly, for the first embodiment (tunable lens based system), no image alignment is needed. The above equation can be directly applied to estimate the intensity derivative.

Alternatively, if three images are acquired, including two images with the same amount of defocus but in opposite direction (i.e. $\pm\Delta z$) the intensity derivative can be estimated from:

$$\frac{\partial I(x, y)}{\partial z} \approx \frac{I_{\Delta z}(x, y) - I_{-\Delta z}(x, y)}{2\Delta z}$$

The central difference could provide a more accurate estimate of the intensity derivative. Therefore, it is preferable to have two $\pm\Delta z$ images than to have one defocused image.

Figure 3:
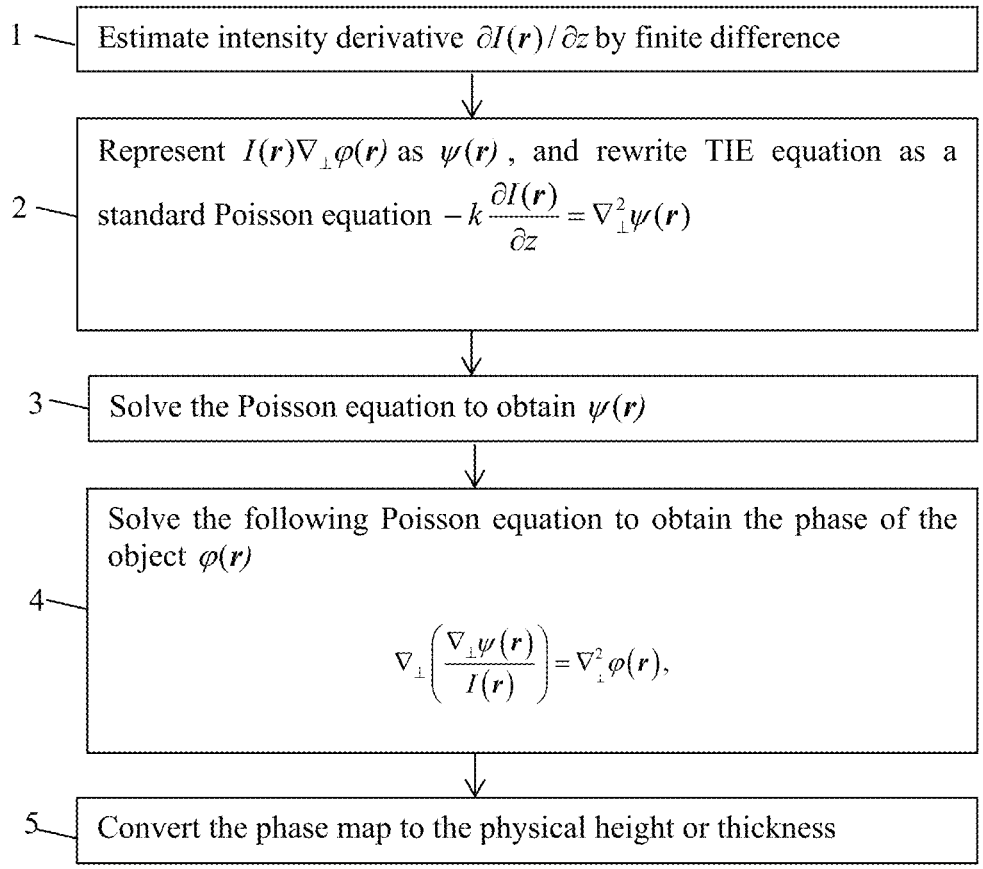
FIG. 3 is a flow chart of steps for analyzing data derived from the set-ups of FIG. 1 and FIG. 2, in embodiments of the invention.

When intensity I(r) and longitude intensity derivative ∂I(r)/∂z have been obtained, the TIE equation (Eq. (1)) can be then solved as follows to get the phase of the object. These steps are illustrated in FIG. 3.

1. Representing $I(r)\nabla_\perp \varphi(r)$ as $\nabla_\perp \psi(r)$, the TIE equation can be rewritten as a standard Poisson equation:

$$-k\frac{\partial I(r)}{\partial z} = \nabla_\perp^2 \psi(r),$$

2. Use a fast Poisson solver for solving the preceding equation to obtain $\psi(r)$
3. Calculate $\nabla_\perp \psi(r)$ from $\psi(r)$ by taking its gradient.
4. Solve the following Poisson equation to obtain the phase of the object $\varphi(r)$ $$\nabla_\perp \left(\frac{\nabla_\perp \psi(r)}{I(r)}\right) = \nabla_\perp^2 \varphi(r),$$

5. Convert the phase map to the physical height or thickness of the object by $$h(r) = \begin{cases} \frac{\varphi(r)}{4\pi} & \text{for refective object} \\ \frac{\varphi(r)}{2\pi\Delta n} & \text{for transmission object} \end{cases}$$

The entire algorithm can be implemented in C++ or another programming language and thus the TIE imaging can be realized in real-time.

5. Using More Defocusing Images to Enhance the Phase Accuracy

When the test object is static, capturing more intensity images at multiple planes can improve the phase accuracy and resolution. One major issue of conventional multiple-plane TIE methods is that they require extra intensity measurements, and thus need a relatively long acquisition time For example, for a 31-image stack, mechanical scanning usually takes about a minute and more than 5 minutes for manual adjustment of the measurement planes. Usually a fast scanning system can improve the image acquisition speed; however, the inertia and the reproducibility of the mechanical system remain problems.

Those shortcomings can be effectively avoided in the present embodiments. The response time of the ETL was 15 ms, which enables time division multiplex scanning up to 60 fps, which greatly reduces the measurement time.

Figure 4:
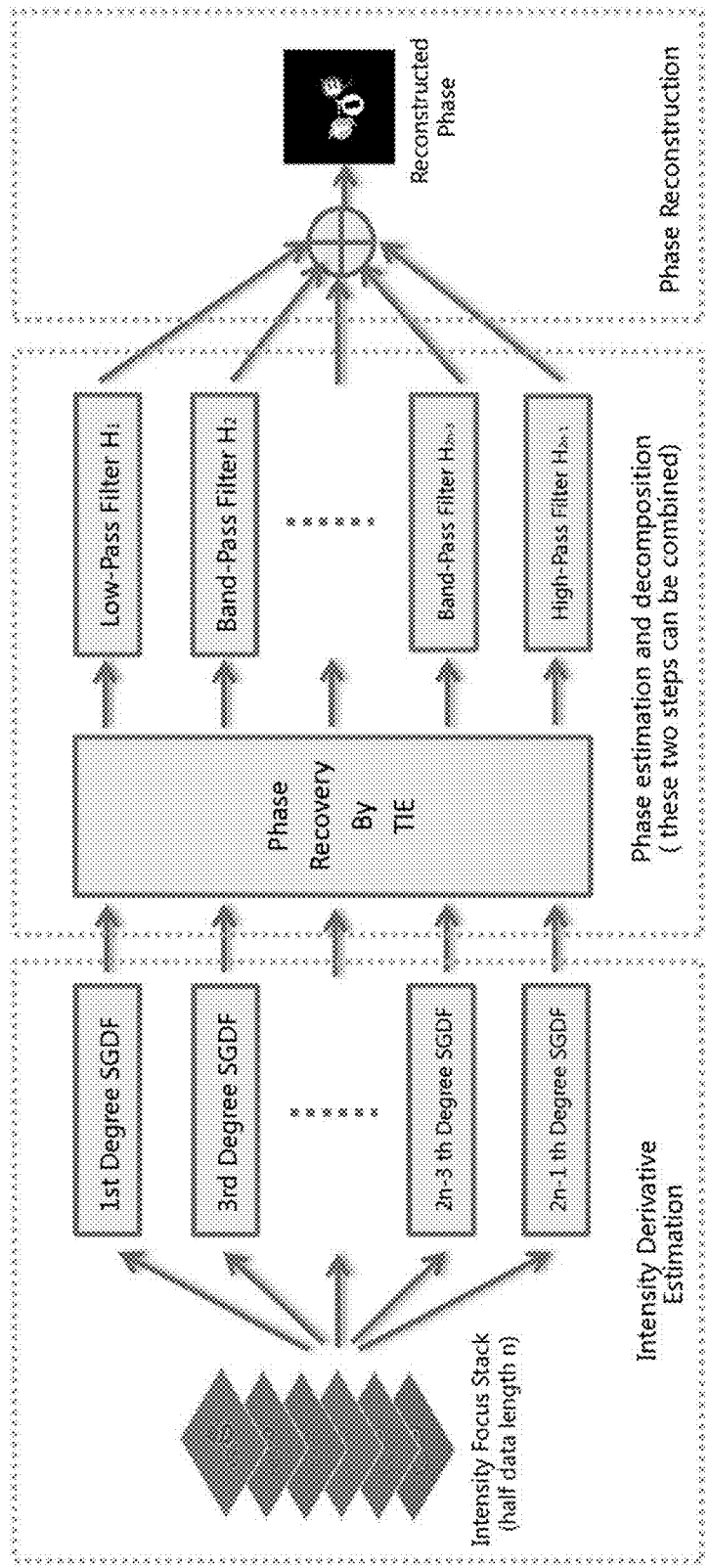
FIG. 4 is a schematic flow chart of a method of collecting a three dimensional image using the set-up of FIG. 1 or FIG. 2.

The processing step for multiple-plane TIE is as follows, and as illustrated in FIG. 4. Consider a 2n+1 image stack with equal pairwise separation of $\Delta z$, where n is a positive integer. The total defocus distance is $-n\Delta z \sim n\Delta z$.

1. Estimate the intensity derivative ∂I(r)/∂z using the m=1, 3, . . . 2n-1 th order of the Savitzky-Golay differentiation filter (SGDF). For the mth order filter, the equation can be written as $$\frac{\partial I(x)}{\partial z} \approx \sum_{i=-n}^{n} \frac{a_i I(x, i\Delta z)}{\Delta z},$$

with coefficients $$a_i = \sum_{k=0}^{m} \frac{(2k+1)(2n)^{(k)}}{(2n+k+1)^{(k+1)}} P_k^n(i) P_k^{n,1}(0).$$

where $(a)^{(b)}$ is a generalized factorial function $(a)(a-1) \ldots (a-b+1)$, and $(a)^{(0)}=0$, and the $P_k^n(t)$ is the Gram polynomials which are defined as $$P_k^n(i) = \sum_{j=0}^{k} \frac{(-1)^{j+k}(j+k)^{(2j)}(m+i)^{(j)}}{(j!)^2 (2m)^{(j)}},$$

and $$P_k^{n,s}(t) = \left(\frac{d^s}{dx^s} P_k^n(t)\right)_{x=t}.$$

2. Using the intensity derivative ∂I(r)/∂z estimated, we can obtain m phases $\phi_m(x)$, m=1, 3, . . . 2n-1 by solving the TIE, corresponding to the numerical processing of the acquired images shown in FIG. 3. Each of the m phases is obtained using all of the acquired images in the 2n+1 image stack [18, 19, 20].
3. Decompose each of the phases obtained by a different order of the Savitzky-Golay differentiation filter using an ideal complementary filter bank. This can be designed with a frequency response $H_m(e^{j\omega})$, m=1, 3, . . . 2n-1 and the amplitudes sum to unity. For m=3, 5, . . . , 2n-3 the filters $H_m(e^{j\omega})$ are band-pass and have the passband from $f_c^m$ to $f_c^{m-1}$, where $f_c^m$ represents the 0.3 dB cutoff of mth order SGDF, which can be written as $$f_c^m = \frac{m - 0.3}{3.5n - 1},$$

For m=1 the filter is a low-pass with the cutoff frequency $f_c^1$ and for m=2n-1 the filter is a high-pass with the cutoff frequency $f_c^{2n-1}$. The phase retrieved by the mth order SGDF is then filtered by $H_k(e^{j\omega})$ to get $\phi'_m(x)$ m=1, 3, . . . 2n-1
4. The final reconstructed phase $\phi(x)$ is their summation $$\phi(x) = \phi'_1(x) + \phi'_3(x) + \ldots + \phi'_{2n-1}(x),$$

Figure 5:
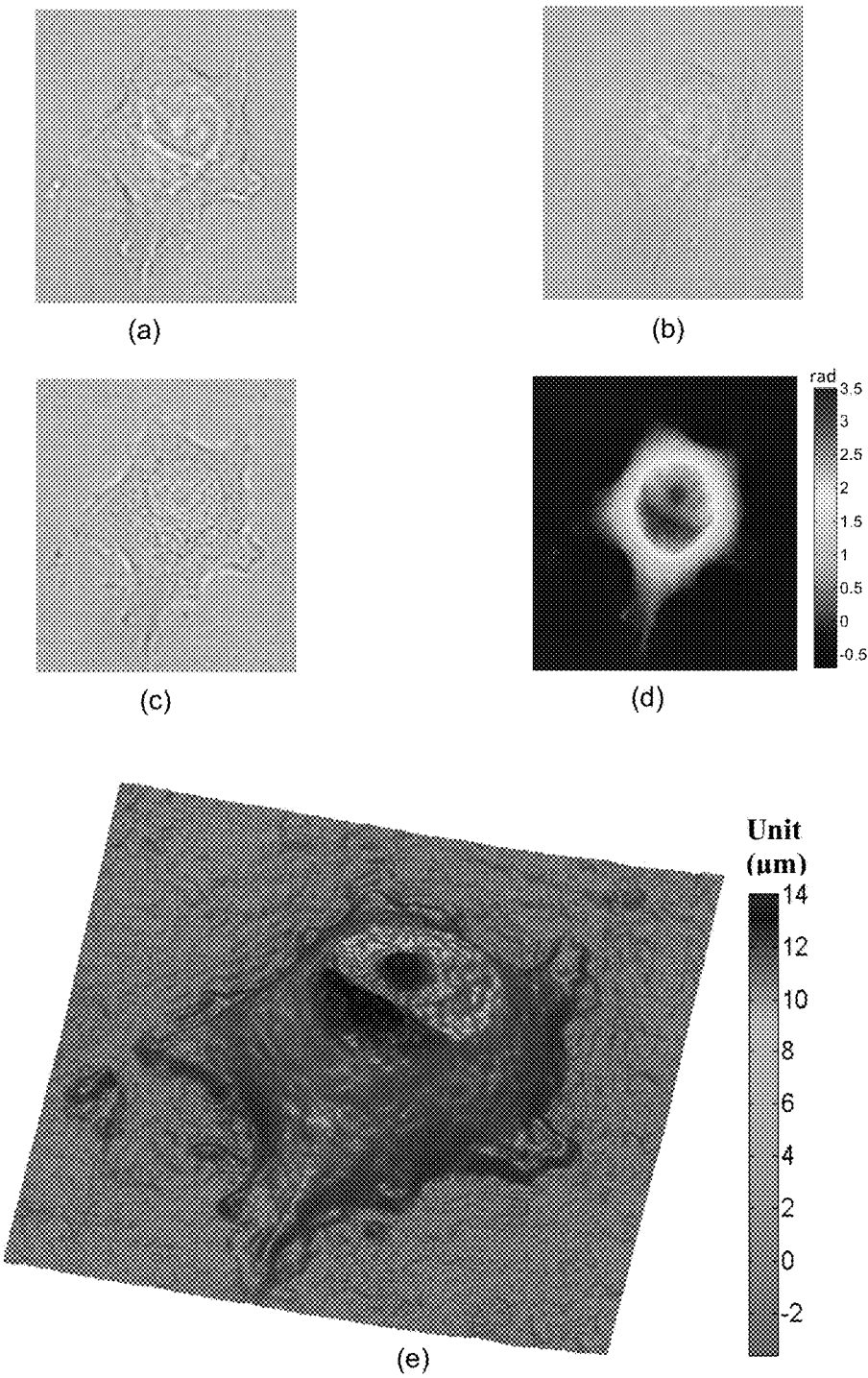
FIG. 5 shows quantitative phase imaging of an individual live cell using the set-up of FIG. 1, and is composed of FIG. 5(a) which shows a first out of focus image, FIG. 5(b) which shows an in-focus image, FIG. 5(c) which shows a second out of focus image, FIG. 5(d) which shows the phase map recovered, and FIG. 5(e) which shows the 3D cell thickness variation obtained from FIG. 5(d)

6 Experimental Results 6.1 Three-Plane Tunable Lens Based TIE (First Embodiment) for Live Cell Imaging FIG. 5 illustrates the result of using the first embodiment (tunable lens based system) to image a live single cell in the culture medium. Three snapshots from the video sequence corresponding to object planes at $\Delta z = -2.5$, 0.0 and +2.5 μm are shown in FIGS. 5(a)-(c). The quantitative phase recovered is shown in FIG. 5(d). By using the quantitative phase information obtained, the physical thickness of cell can be calculated (the refractive index difference between MCF-7 and the medium is 0.019). FIG. 5(f) shows the 3D rendering of the specimen, which shows high quality and high contrast surface details on the cell and provides an accurate profile of optical thickness.

6.2 Two-Plane Single-Shot TIE (Second Embodiment)

Figure 6:
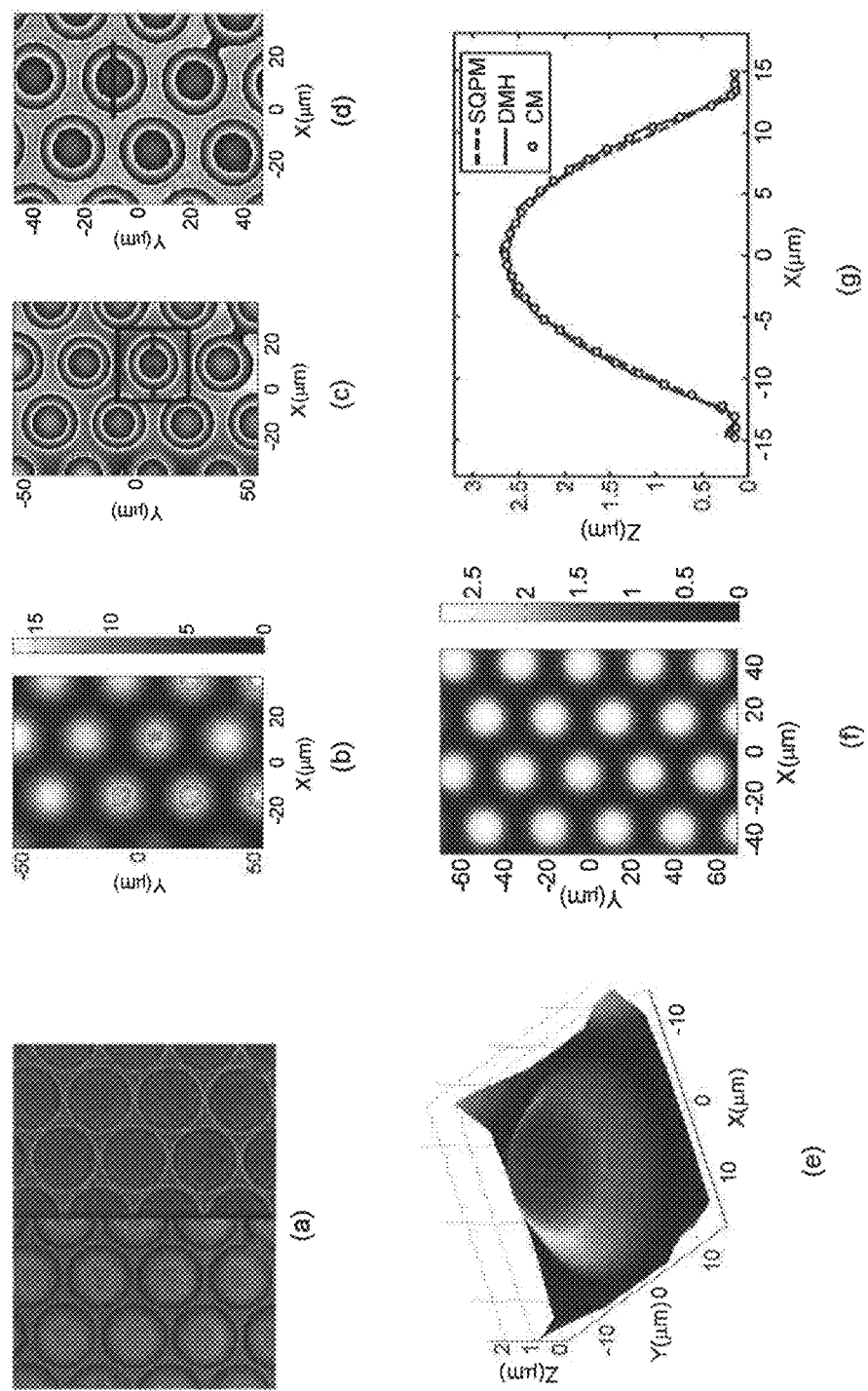
FIG. 6 shows experimental results of imaging a lens array using the set-up of FIG. 2, and is composed of FIG. 6(a) which is raw images obtained in both halves of the camera in a single-shot, FIG. 6(b) which shows the recovered phase, FIG. 6(c) which shows a rewrapped phase from FIG. 6(b)

FIG. 6 illustrates the result of using the second embodiment to measure a plano-convex linear microlens array with 30 μm pitch from SUSS MicroOptics which was used as the test sample. FIG. 6(a) shows the raw images of the microlens array obtained in both halves of the camera in a single-shot. The right-side shows the best focus image, while the left-side depicts the defocused one controlled by the SLM. The defocus distance between the two planes was chosen as 8.5 µm. After registration, the intensity derivative can be obtained. FIG. 6(b) shows the recovered phase and FIG. 6(c) shows the rewrapped phase with the range within 2π.

For comparison, the same sample was also measured using a digital holography microscopy (DHM) system (laser wavelength 650 nm, magnification 43×), and the wrapped phase is shown in FIG. 6(d). The three-dimensional profile of one single lens (indicated by the black square region in FIG. 6(e) was obtained by converting the phase to the physical height of the lens. FIG. 6(f) is the height distribution obtained using a confocal system, while FIG. 6(g) shows the comparison of the line profiles using the confocal, DH and TIE systems respectively. Given the height profile of the lens, the radius of curvature (ROC) can be calculated by $$ROC = h/2 + D^2/8h, \qquad (8)$$

where h is the height of the microlens, and D is the diameter of the microlens. Considering the fill factor of the microlens array, the diameter of the microlens is 27 µm. The average height h of the microlens are measured as 2.371 µm for our method and 2.464 µm for DHM. Thus, the calculated ROC is 396 µm for our method and 382 µm for DHM, which both correspond reasonably well to the ROC value provided by the supplier (390 µm).

REFERENCES

1. F. Zernike, "How I Discovered Phase Contrast," Science 121, 345-349 (1955).
2. G. Nomarski, "Differential microinterferometer with polarized waves," J. Phys. Radium 16, 9s-13s (1955).
3. E. Cuche, P. Marquet, and C. Depeursinge, "Simultaneous amplitude-contrast and quantitative phase-contrast microscopy by numerical reconstruction of Fresnel off-axis holograms," Appl. Opt. 38, 6994-7001 (1999).
4. Q. Weijuan, C. O. Choo, Y. Yingjie, and A. Asundi, "Microlens characterization by digital holographic microscopy with physical spherical phase compensation," Appl. Opt. 49, 6448-6454 (2010).
5. B. Rappaz, P. Marquet, E. Cuche, Y. Emery, C. Depeursinge, and P. Magistretti, "Measurement of the integral refractive index and dynamic cell morphometry of living cells with digital holographic microscopy," Opt. Express 13, 9361-9373 (2005).
6. B. Kemper and G. von Bally, "Digital holographic microscopy for live cell applications and technical inspection," Appl. Opt. 47, A52-A61 (2008).
7. M. Reed Teague, "Deterministic phase retrieval: a Green's function solution," J. Opt. Soc. Am. 73, 1434-1441 (1983).
8. A. Barty, K. A. Nugent, D. Paganin, and A. Roberts, "Quantitative optical phase microscopy," Opt. Lett. 23, 817-819 (1998).
9. D. Paganin and K. A. Nugent, "Noninterferometric Phase Imaging with Partially Coherent Light," Physical Review Letters 80, 2586-2589 (1998).
10. L. Waller, Y. Luo, S. Y. Yang, and G. Barbastathis, "Transport of intensity phase imaging in a volume holographic microscope," Opt. Lett. 35, 2961-2963 (2010).
11. L. Waller, S. S. Kou, C. J. R. Sheppard, and G. Barbastathis, "Phase from chromatic aberrations," Opt. Express 18, 22817-22825 (2010).
12. S. S. Gorthi and E. Schonbrun, "Phase imaging flow cytometry using a focus-stack collecting microscope," Opt. Lett. 37, 707-709 (2012).
13. E. D. Barone-Nugent, A. Barty, and K. A. Nugent, "Quantitative phase-amplitude microscopy I: optical microscopy," Journal of Microscopy 206, 194-203 (2002).
14. J. W. Goodman, Introduction To Fourier Optics, 3th ed. (Roberts & Company Publishers, 2005).
15. S. Ulf and P. O. J. Werner, "Digital recording and numerical reconstruction of holograms," Measurement Science and Technology 13, R85 (2002).
16. E. Hecht, Optics, 4th ed. (Addison-Wesley Longman, Incorporated, 2002).
17. C. Falldorf, M. Agour, C. v. Kopylow, and R. B. Bergmann, "Phase retrieval by means of a spatial light modulator in the Fourier domain of an imaging system," Appl. Opt. 49, 1826-1830 (2010).
18. C. Zuo, Q. Chen, W. Qu, and A. Asundi, "Noninterferometric single-shot quantitative phase microscopy," Optics letters 38, 3538-3541 (2013).
19. C. Zuo, Q. Chen, W. Qu, and A. Asundi, "High-speed transport-of-intensity phase microscopy with an electrically tunable lens," Optics Express 21, 24060-24075 (2013).
20. C. Zuo., Q. Chen, Y. Yu, A. Asundi, "Transport-of-intensity phase imaging using Savitzky-Golay differentiation filter-theory and applications," Optics Express 21, 5346-5362 (2013)

The invention claimed is:
1. An apparatus for imaging a specimen, the apparatus comprising:
  an microscope system for forming a magnified image of a portion of the specimen;
  an image capture device for capturing an image;
  an optical relay system located between the microscope system and the image capture device;
  the optical relay system being configured to receive the magnified image of the portion of the specimen and comprising a control element for modifying at least one beam of light passing through the optical relay system to vary a plane within the specimen which is in focus in the image captured by the image capture device; and
  a computer unit;
  whereby the image capture device is operative to capture multiple images in which different respective planes of the specimen are put in focus by the optical relay system, and wherein the computer unit is arranged to use the multiple captured images at different respective focal planes in the specimen to generate a phase map of the portion of the specimen, indicating the degree to which respective parts of the specimen modify the phase of light transmitted to the specimen by the microscope system,
  wherein the generation of the phase map includes:
    generating intensity derivative values for respective portions of the specimen labeled by variable r, the intensity derivative values indicating, for each said respective portion of the specimen, a derivative of the intensity in a direction in which light of the microscope system impinges on the specimen;
    forming a first Poisson equation using the intensity derivative values;
    solving the Poisson equation to generate an intermediate function ψ(r);
    forming a derivative of the intermediate function; and solving a second Poisson equation involving the intermediate function to obtain the phase map;

wherein the multiple images consist of 2n+1 images with equal pairwise separation of $\Delta z$, where n is a positive integer;

said intensity derivative being derived as a summation over the images of a function of each respective image multiplied by a coefficient obtained using a Gram polynomial, and a respective said phase map being generated from respective pairs of the multiple images;

subjecting each phase map to a respective band-pass operation; and forming a combined phase map from the results of the band-pass operations.

2. An apparatus according to claim 1 in which the magnification of the image captured by the image capture device is independent of the variation caused by the control element.

3. An apparatus according to claim 1 in which the optical relay system is a 4f relay system having two lenses.

4. An apparatus according to claim 1 in which the control element comprises at least one electronically tunable lens.

5. An apparatus according to claim 4 in which the electronically tunable lens is in a Fourier plane of the optical relay system.

6. An apparatus according to claim 1 in which the control element comprises at least one electronically controllable element for modifying the phase of the beam.

7. An apparatus according to claim 1 in which a beam splitter is provided to form a plurality of beams from the output of the microscope system and the control element is arranged to modify the focal plane of the beams to different respective degrees, the image capture device being arranged to capture respective images using each of the beams, such that multiple images with different focal planes are generated from the respective beams.

8. An apparatus according to claim 7 in which the plurality of beams are directed and are captured at respective locations on an image capturing surface of the image capture device which are spaced apart parallel to the image capturing surface.

9. An apparatus according to claim 8 in which at least one of the beams is subject to an reflection from a reflective surface which is at a non-zero angle to the direction at which the beam impinges on the reflective surface.

10. A method for imaging a sample, the method comprising:

capturing multiple images of a portion of specimen, the images having different respective focal planes, by (i) forming a magnified image of the portion of the specimen using a microscope system;

(ii) transmitting the magnified image through an optical relay system to an image capture device which captures the multiple images, wherein the optical relay system comprises a control element for modifying the magnified image to vary the focal plane of the image captured by the image capture device; and using the multiple captured images at different respective focal planes in the specimen to generate a phase map of the portion of the specimen, indicating the degree to which respective parts of the specimen modify the phase of light transmitted to the specimen by the microscope system, wherein the generation of the phase map includes:

generating intensity derivative values for respective portions of the specimen labeled by variable r, the intensity derivative values indicating, for each said respective portion of the specimen, a derivative of the intensity in a direction in which light of the microscope system impinges on the specimen;

forming a first Poisson equation using the intensity derivative values;

solving the Poisson equation to generate an intermediate function $\Psi(r)$;

forming a derivative of the intermediate function; and solving a second Poisson equation involving the intermediate function to obtain the phase map;

wherein the multiple images consist of 2n+1 images with equal pairwise separation of $\Delta z$, where n is a positive integer;

said intensity derivative being derived as a summation over the images of a function of each respective image multiplied by a coefficient obtained using a Gram polynomial, and a respective said phase map being generated from respective pairs of the multiple images;

subjecting each phase map to a respective band-pass operation; and forming a combined phase map from the results of the band-pass operations.

11. A method according to claim 10 in which the control element is modified at least once by supplying an electronic signal to it, the multiple images including images captured before and after the modification.

12. A method according to claim 10 in which the magnified image is transmitted to a beam splitter which generates multiple beams, the control element being arranged to modify one of the beams, and the image capture device being arranged to capture the multiple images from the different respective beams.

* * * * *